United States Patent
Wilbers et al.

(10) Patent No.: US 12,007,238 B2
(45) Date of Patent: Jun. 11, 2024

(54) POSITIONING SYSTEM AND METHOD FOR OPERATING A MOBILE UNIT POSITIONING SYSTEM

(71) Applicant: VOLKSWAGEN AKTIENGESELLSCHAFT, Wolfsburg (DE)

(72) Inventors: Daniel Wilbers, Wolfsburg (DE); Christian Merfels, Braunschweig (DE); Bernd Rech, Bokensdorf (DE); Thilo Schaper, Lehrte (DE); Niklas Koch, Wolfsburg (DE); Stefan Jürgens, Braunschweig (DE); David Perdomo Lopez, Braunschweig (DE); Constanze Hungar, Braunschweig (DE); Stefan Wappler, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 410 days.

(21) Appl. No.: 16/719,617

(22) Filed: Dec. 18, 2019

(65) Prior Publication Data

US 2020/0200544 A1    Jun. 25, 2020

(30) Foreign Application Priority Data

Dec. 21, 2018    (DE) ...................... 10 2018 133 461.3

(51) Int. Cl.
*G01C 21/30*    (2006.01)
*G01C 21/00*    (2006.01)
(Continued)

(52) U.S. Cl.
CPC .......... *G01C 21/30* (2013.01); *G01C 21/3811* (2020.08); *G01C 21/3837* (2020.08); *G06N 5/04* (2013.01); *G06N 20/00* (2019.01)

(58) Field of Classification Search
CPC ................ G01C 21/30; G01C 21/3811; G01C 21/3837; G06N 5/04; G06N 20/00
See application file for complete search history.

(56) References Cited

U.S. PATENT DOCUMENTS 5,627,915 A * 5/1997 Rosser .............. G06F 18/24323
382/278
9,134,734 B2   9/2015 Lipkowski et al.
(Continued)

FOREIGN PATENT DOCUMENTS

DE    102016214028 A1    2/2018
EP        2490092 A1    8/2012
WO     2014189495 A1   11/2014

*Primary Examiner* — James J Lee
*Assistant Examiner* — Wenyuan Yang
(74) *Attorney, Agent, or Firm* — Barnes & Thornburg LLP

(57) ABSTRACT

A method for providing map data which include position information for first landmarks of a first landmark class, collecting environment data, and determining a position of the mobile unit. Training data are generated and stored for the first landmarks based on the position of the mobile unit, the collected environment data and the position information. Based on the training data, a first detector module is generated for detecting the first landmark class. The position determination system includes a memory unit for providing map data which include position information for first landmarks of a first landmark class, a data acquisition unit for collecting environment data, a localization unit for determining a position of the mobile unit, and a processing unit for generating and storing training data based on the position of the mobile unit, the collected environment data and the position information for the first landmarks.

11 Claims, 2 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 2010/0110412 A1* | 5/2010 | Basu | G01C 15/002 |
| | | | 356/3 |
| 2010/0176987 A1 | 7/2010 | Hoshizaki | |
| 2012/0013713 A1* | 1/2012 | Sumitomo | G06T 7/246 |
| | | | 348/46 |
| 2013/0182909 A1* | 7/2013 | Rodriguez-Serrano | |
| | | | G06V 30/148 |
| | | | 382/173 |
| 2019/0122424 A1* | 4/2019 | Moore | G06N 7/00 |
| 2019/0137280 A1* | 5/2019 | Ghadiok | G06V 10/40 |
| 2020/0364588 A1* | 11/2020 | Knox | G06N 3/08 |
| 2021/0180979 A1* | 6/2021 | Kitahara | G08G 1/0112 |
| 2022/0237961 A1* | 7/2022 | Chan | G07C 5/085 |

* cited by examiner

POSITIONING SYSTEM AND METHOD FOR OPERATING A MOBILE UNIT POSITIONING SYSTEM

PRIORITY CLAIM

This patent application claims priority to German Patent Application No. 10 2018 133 461.3, filed 21 Dec. 2018, the disclosure of which is incorporated herein by reference in its entirety.

SUMMARY

Illustrative embodiments relate to a method for operating a position determination system for a mobile unit. Illustrative embodiments also relate to a position determination system for a mobile unit.

BRIEF DESCRIPTION OF THE DRAWINGS

The disclosed embodiments will now be explained with reference to the drawings.

DETAILED DESCRIPTION

Figure 1:
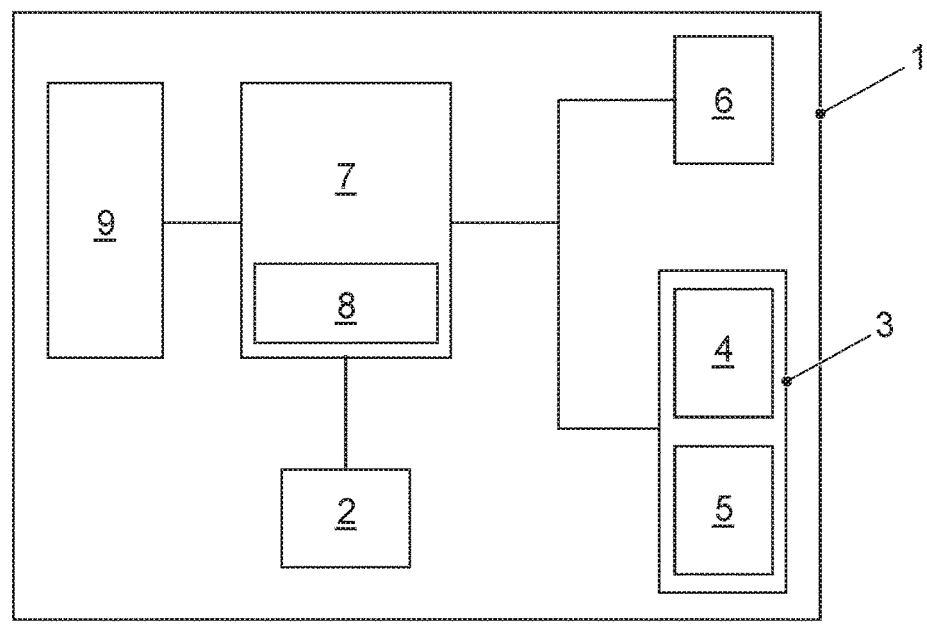
FIG. 1 shows a transportation vehicle with an exemplary embodiment of the disclosed position determination system.

Many driving functions in modern transportation vehicles, particularly in the case of at least partially automatically controlled transportation vehicles, require a reliable and accurate self-localization of the transportation vehicle. Various approaches to this problem are known. For example, patterns and structures in the transportation vehicle's environment are detected and compared with corresponding entries in a map. These approaches presuppose that the transportation vehicles are equipped with special detectors that can extract environmental features from the sensor information.

Patent US 2010/0176987 A1 proposes a method for estimating the position of a vehicle and detected landmarks, in which GPS and a camera are used. The navigation carried out using GPS is improved on the basis of known landmarks, while new landmarks are included in a database at the same time.

In patent EP 2 490 092 A1 a method for autonomous localization of a driverless motorized vehicle is disclosed, in which a trajectory to be driven is computed and determined, which can use known landmarks to support localization. These landmarks are then detected and used during the movement.

Document DE 10 2016 214 028 A1 proposes a method for determining a position of a mobile unit, in which landmarks in the vicinity of a mobile unit are tracked. The position is determined by a particulate filter from a plurality of hypotheses.

Document WO 2014/189495 A1 discloses a method for simultaneously and automatically generating a database with Wi-Fi information, in which landmarks and Wi-Fi signals are detected and used for localization. New information regarding positions and Wi-Fi signals can be added to a database.

Disclosed embodiments provide a position determination system and a method for its operation, which allow a maximally comprehensive use of available information about the environment.

This is achieved by the disclosed method and the disclosed system.

In the disclosed method of the type mentioned at the outset, map data are provided which comprise position information for first landmarks of a first landmark type. Environment data are collected and a position of the mobile unit is determined. Training data for the first landmarks are generated and stored based on the position of the mobile unit, the collected environment data and the position information. On the basis of the training data a first detector module for detecting the first landmark type is generated.

As a result, it is possible to provide up-to-date detector modules in the transportation vehicle at all times, without the need to perform time-consuming software updates. Instead, detector modules can be generated or learned automatically.

The first detector module generated on the basis of the training data is configured to detect landmarks of the first landmark type. The landmarks of the first landmark type detectable by the first detector module can comprise specific first landmarks, for which in the method position data are already included in the map data and which are used to generate the training data. It is also possible, however, for other landmarks of the first landmark type to be detected, for which corresponding position data are included in map data provided later and which are to be used for position determination at a later date.

A basic idea of the disclosure is to determine, on the basis of available environment data, the characteristic features of particular types of landmark. For example, if no detector module is available for detecting the first landmark type, then in the method it is determined where the first landmarks are located relative to the mobile unit in accordance with the map data. Environment data collected in these areas are then stored and used to create the first detector module. For example, a detector module for hydrants can be generated by using the map data to test the positions at which hydrants are located. The environment data collected there can be used to determine what these objects look like and a corresponding detector module is generated.

The term "landmarks" within the meaning of the disclosure comprises features and/or patterns in an environment that can be identified and to which at least one piece of location information can be assigned. This may be, for example, characteristic points or objects which are arranged at specific positions in the surrounding area. The landmarks can have a semantics, which means that they can also be identifiable as such for human perception as identifiable objects or characteristics (features). In addition, landmarks are also included which have no semantics, but which represent abstract patterns, for example, that can be detected by a pattern recognition system.

The landmarks can be assigned to landmark types in a known manner, in particular, using a categorization based on geometric properties or on the basis of a semantics which is associated with the landmarks. For example, road markings, posts, signs, buildings, elements of vegetation or buildings of traffic control systems can each be defined as different landmark types. In addition, multiple specific landmark types, such as "Stop signs" and "No Parking signs", can be assigned to a more general or generic landmark type, such as "signs". In the method each landmark can be assigned at least one landmark type. A specific landmark can also be assigned to multiple specific and/or generic landmark types.

Landmark types can also be such items as edges or other parts of buildings, markings on a road surface, traffic management systems or two-dimensional codes. For example, lane markers, turn arrows, parking space markers or similar surface markings, poles, stakes, columns, traffic or other signs, signal systems or traffic lights, building edges or corners, pipes, QR or bar codes and alphanumeric representations can be detected. In the same way, other features can be used for a localization which designate characteristic, localizable points in a geographic area surrounding the transportation vehicle's own position. In general, these are features that can be identified by a pattern recognition method and to which position data can be assigned.

The map data comprise position information for the landmarks, that is to say, information about their location in a coordinate system. This may be a global or relative coordinate system. The position data relate, in particular, to poses of the landmarks, in other words a combination of their position and their location, described, for example, on the basis of their orientation in a global coordinate system or relative to other landmarks. For example, an arrow can point in a particular direction in space, a post can have a certain length and extend at a certain angle to a road surface, or an edge of a building can be located in a certain orientation relative to a road.

The environment data are collected in a known way. For example, the environment data are collected by sensors of a transportation vehicle, in particular, by optical, radar, lidar or ultrasonic sensors. This allows existing equipment of the transportation vehicle to be used to capture relevant environment data.

It can additionally be provided that environment data are collected using an interface of an external device. For example, this may be a permanently installed sensor for traffic monitoring, which collects and provides environment data. An external server may also be used, which receives, stores, and if necessary provides, relevant environment data. Such environment data may be recorded and transferred to the server, for example, by other transportation vehicles and equipment along the route.

A distinction is made between different types of sensors, wherein a sensor of a specific sensor type collects environment data according to a specific physical measurement principle. For example, radar sensors are sensors of a first type and ultrasonic sensors are sensors of another type. In addition, a further differentiation can be made, for example, a distinction between different types of radar sensors which differ from each other in their design and/or a particular type of data processing, for example.

Landmarks of a specific landmark type can be described on the basis of a pattern, which is capable of detecting a landmark of the particular landmark type in environment data. The information can comprise such items as a mathematically formulated description for detecting a pattern with which a landmark or a feature of the environment is represented in the signals of a sensor. For example, geometrical properties of objects of a landmark type are described, but also material properties such as reflectance values, or mathematical functions such as gradients of light/dark transitions.

Such descriptions for detecting landmarks of a landmark type are, in general, sensor-specific, so that it makes sense for separate pattern descriptions for the detection to be provided for the different types of sensors. For example, the detection of patterns in an image of an optical camera differs from the detection within a point cloud detected by a laser scanner. However, generic information suitable for several types of sensors can also be provided for the detection. In addition, the data collected by a certain type of sensor can be processed in such a way that the same detection method can be applied to it as for data of a different sensor type.

The detection of the landmarks on the basis of the environment data is carried out in a known manner, in particular, by pattern recognition methods by which the landmarks can be detected, for example, in camera images or laser point clouds. For this purpose, so-called "detector modules" are used. Within the meaning of the disclosure these are software modules that comprise, for example, a storable file. The detector modules are designed such that they can be used to detect landmarks of a specific landmark type on the basis of the environment data collected. The detector modules can be designed specifically for the detection of a particular landmark type. It can be provided that at least one landmark type is assigned to each detected landmark.

In the method, detector modules are available for specific landmark types. For example, they can be stored in a memory unit or be available to a processing unit in another way. In the disclosure, the first detector module is generated because, for example, initially it does not exist. Generating the detector module can also comprise an updating of an existing detector module. The existing detector module can be replaced by a newly generated detector module or it can be changed, for example, by the already existing detector module being used in the generation.

On detecting a landmark by a detector module, the landmark type to which the landmark is to be allocated can be determined. Position data can also be determined for the detected landmarks, wherein the landmark is assigned a position or a pose in a coordinate system. This can take place in the detection operation or in a separate operation. The position or pose can be determined as a function of the assigned landmark type by, for example, specific axes being defined for specific landmark types to determine the location of the landmark, or by certain sections of a landmark being used to determine the position of the landmark. For example, the longitudinal extent of a post can be used to determine its extent, or it can be specified that its position should be determined on the basis of its position on the earth's surface. In this case a global or relative coordinate system can be used, for example, a relative system relative to a data acquisition unit or a transportation vehicle. The position can be related to the positions of other detected landmarks or to a position of the sensor on the basis of whose data the detection is performed. Also, additional features can be determined for the detected landmarks, such as their size and shape, color, a parameter to describe dynamic features, or by evaluating a label text.

The first detector module generated in the method on the basis of the training data is used to perform the detection for any landmarks of the first landmark type and on the basis of newly collected environment data to determine the above information for these arbitrary landmarks of the first landmark type. By the first detector module generated in the method, the first landmarks can also be detected for which position information are already provided with the map data in the method, but the detection is not limited to these specific first landmarks.

In this case, the detection of landmarks of a landmark type can be carried out for certain types of sensors in a specific manner, which means that information about the corresponding pattern is provided in such a way that landmarks of a landmark type can be detected in the environment data which were collected by the specific sensor type. This takes into account the fact that the recognition of a pattern on the basis of environment data depends on the type of the sensor by which these environment data were collected.

In the method a position, in particular, a pose, of the mobile unit is also determined. This can also be carried out in a global or a relative coordinate system. The position is determined in a known way, for example, by a landmark-based localization based on detected landmarks. To do this, it is necessary that detector modules for these landmarks are already available, which allow the detection of the landmarks of specific landmark types in the environment. Alternatively or additionally, a different position determination system can be used, for example, by use of a global navigation satellite system (GNSS), such as GPS.

In at least one exemplary embodiment of the disclosed method, the map data also comprise position information for second landmarks of a second landmark type, and by a second detector module for the second landmark type the second landmarks are detected on the basis of the environment data. In this case, the position or pose of the mobile unit is determined on the basis of the detected second landmarks. The position of the mobile unit can therefore be determined based on landmarks.

When detecting the second landmarks their positions relative to the mobile unit are also determined and the mobile unit's own position is then obtained by a comparison of the relative positions and the position information for the second landmarks in the map data.

The position or pose is determined relative to a coordinate system of the map data. This allows the collected environment data to be transformed into the coordinate system of the map data, or vice versa. This means that position information derived from the environment data can be assigned to positions of the map data. For example, a landmark which is detected in the environment data at a particular position can be assigned to a specific position in the map data. Conversely, on the basis of a position of the map data, a position information item within the environment data can be assigned. In other words, if the map data include information stating that a landmark is located at a specific position, then corresponding environment data can be identified which should be assigned to this position.

The method is based on the fact that the collected environment data comprise information about the first landmarks, even if no suitable first detector module is available to actually detect the first landmarks of the first landmark type. On the basis of the map data it is possible to determine which part of the environment data corresponds to the first landmarks. To generate the first detector module, the environment data are then used as the starting point of a training process for landmarks of the first landmark type. The generated detector module can then be used, for example, for a landmark-based localization.

In a further design, the first landmarks are detected by the first detector module at a later time and the position of the mobile unit is determined on the basis of the detected first landmarks. This means that the generated detector module is used for determination of the transportation vehicle's own position, for example, to provide a more accurate position determination.

A sliding window procedure is used to detect the landmarks based on the environment data. In this case, the collected environment data are rasterized by a "sliding window" and the content of each field of the grid is examined using the detector modules for structures which match landmarks.

The method is performed iteratively, wherein the detector module can be updated at specified intervals. In addition, the generated detector module may also be used for position determination to generate from scratch additional, not yet existing detector modules on the basis of the method.

In an extension the training data comprise a subset of the collected environment data, the subset being generated based on the position information about the first landmarks. This allows the training data for the first landmark type to be generated in a particularly targeted way.

A portion of the collected environment data is used to generate the training data, wherein a plurality of portions of environment data can be used that were collected at different times, at different locations and under different conditions. To define the portion a "bounding box" can be defined which defines the portion of the environment data; for example, portions of a certain size and shape can be used.

This process takes into account the positions at which the portions of the environment data are located and these are compared with the position information from the map data for the first landmarks. The map data comprise, for example, information about the position of a specific first landmark, and to generate the training data a portion of the environment data is used which corresponds to this position. The training data therefore include environment data that were collected at the positions which correspond to the positions of the first landmarks in accordance with the map data.

In one design the map data comprise additional information about landmarks of the first landmark type. In a further design, the additional information are collected from a different source. This facilitates the process of locating such landmarks in the environment data.

Such additional information may relate, for example, to a suitable bounding box, which is suitable for extracting the landmarks from the environment data or for selecting a suitable window in the sliding window procedure; for example, an approximate size and shape of the landmarks can be specified. Such a size can also be specified, for example, as the radius of a circle or on the basis of the semi-axes of an ellipse. In addition, an orientation, a color and other features can be included, which enable the recognition of a landmark of the first landmark type.

For example, the detection can thus be limited to narrow, vertically oriented structures of a certain size and color, which corresponds, for example, to generating a detector module for hydrants to a good first approximation. Alternatively or additionally, a circle radius can be specified which encloses an area typically occupied by the landmarks of one landmark type.

In one design of the method the additional information comprises an assignment of the first landmark type to a generic landmark type. This facilitates the generation of the first detector module.

The generic landmark type can comprise, for example, a larger group of landmark types. If a corresponding detector module for the generic landmark type already exists, the potential candidates for the first landmark type can immediately be restricted to these landmarks. When generating the first detector module it is then determined what properties the landmarks assigned to the first landmark type have in common compared to other landmarks of the generic landmark type.

In a further design the first detector module is generated by a machine learning procedure. The module is therefore generated particularly simply and rapidly. Various known methods may be used, for example, Deep Learning methods, a Support Vector Machine or other statistical methods. Alternatively or in addition, other methods can be used those used in image processing.

In one extension the first detector module is generated if the training data satisfy a quality criterion. This ensures an adequate quality of the generated first detector module.

For example, a threshold can be defined to evaluate at least a certain number of portions of the environment data for generating the first detector module. In addition, the quality of the environment data, in particular, for the individual portions, can be quantified and compared with a threshold value, for example, to exclude environment data with poor recording quality. In addition, it can be checked whether the training data were generated on the basis of environment data that were recorded under certain collection conditions, for example, at different positions, from different directions relative to the landmarks, in different weather conditions or in different lighting conditions or at different times of day. It can thus be ensured that a detection module generated on the basis of the training data will continue to be suitable for reliable detection in the future.

In one design of the method, when generating the first detector module a correlation is determined for the training data and a test is performed as to whether the correlation exceeds a threshold value. The machine learning procedure used is based on comparing portions of the environment data comprised by the training data with each other and/or with negative examples without the landmarks, and determining correlations. This ensures that the recognition of the landmarks works reliably.

It is checked whether the recognition of landmarks of the first landmark type is also reliable in tests for false positives, that is to say, whether in data sets of environment data where the first landmark type does not exist, no landmarks of this type are in fact detected.

In a further design the first detector module is generated by a learning unit integrated in the mobile unit. The generation in this case is carried out independently by the mobile unit and is therefore independent of other units. It is not necessary to transfer information to another unit, a process which could be problematic, for example, in relation to data protection issues.

In addition, the first detector module can then be transferred to an external unit. It may also be made available to other mobile units, for example, directly via a direct data connection or indirectly, mediated by an external server.

In an extension, the training data are transferred to an external unit. The first detector module is generated by the external unit and the first detector module is transferred to the mobile unit. The first detector module can also be made available to other units. As a result, time-consuming computational processes can be relocated away from the mobile unit. Known precautions are provided to ensure the necessary data protection.

In another design an output is generated on the basis of the training data and a user is prompted to confirm the training data. This enables a manual checking of the quality of the training data.

For example, the output can comprise excerpts from camera images, which in accordance with the map data are expected to match the positions of the first landmarks. The user can then check whether the first landmarks are actually included in the image excerpts. As appropriate, excerpts can be confirmed or rejected.

The disclosed position determination system for a mobile unit has a memory unit for providing map data, which comprise position information for first landmarks of a first landmark type. It also comprises a data acquisition unit for collecting environment data, a localization unit for determining a position of the mobile unit, a processing unit for generating and storing training data based on the position of the mobile unit, the collected environment data and the position information for the first landmarks, and a learning unit for generating a first detection module for detecting the first landmark type based on the training data. The detection module is designed to detect landmarks of the first landmark type on the basis of the collected environment data.

The disclosed system is designed to implement the above described method. The disclosed system therefore has the same benefits as the disclosed method.

In the disclosure, landmarks of a particular type are detected by a specific software module and the detected instances of the landmark type are evaluated and used for determining the position. In the method a detector module is generated, which can be used to detect an in principle arbitrarily large number of different landmarks of this particular type. On the basis of further environment data it is therefore possible to detect landmarks which were not collected in the training process, for example, because they have been recently added or because the mobile unit is located in a new environment.

In at least one exemplary embodiment of the disclosed system the data acquisition unit comprises a camera and/or a lidar, radar and/or ultrasonic sensor. Thus, already widespread sensors can be used and the system can be integrated cost-effectively into existing transportation vehicles, for example.

In a further design the first detector module is generated for a specific sensor type of the data acquisition unit. The detection of the first landmarks can therefore be carried out in a sensor-specific way and particularly reliably. The detector module can also be created specifically for the type of sensors which are particularly well suited to the acquisition of landmarks of the first landmark type.

This takes into account the fact that differently structured data are collected depending on the sensor type. This also means that different physical features can be detected in the environment of the mobile unit. A detector module for a specific sensor type therefore comprises sensor-specific parameters for detecting the landmarks of a specific landmark type. It may also relate to sensor-specific patterns, on the basis of which landmarks of the specific landmark type can be detected. For example, a generated sensor-specific detector module can be formed such that it allows the detection of landmarks of a particular type on the basis of environment data, which were collected by a laser scanner, a camera, a time-of-flight camera, a radar or lidar sensor or an ultrasonic sensor.

A disclosed transportation vehicle comprises a disclosed position determination system.

With reference to FIG. 1 a transportation vehicle having an exemplary embodiment of the disclosed position determination system will be described.

The transportation vehicle 1 comprises a data acquisition unit 3, which in turn comprises a camera 4 and a lidar scanner 5. The transportation vehicle also comprises a localization unit 6. The data acquisition unit 3 and the localization unit 6 are connected to a processing unit 7, which comprises a learning unit 8. A touchscreen 9 and a storage unit 2 are also connected to the processing unit 7.

In the exemplary embodiment the localization unit 6 comprises a GPS module and a module for performing a landmark-based position determination. In further exemplary embodiments, different procedures or combinations thereof can be used as an alternative or in addition.

In a further exemplary embodiment the data acquisition unit 3 comprises other types of sensors or combinations thereof. For example, a radar scanner, an ultrasonic sensor or a time-of-flight camera can be provided. In addition, an interface can be provided via which data captured from a transportation vehicle-external unit can be received.

Figure 2:
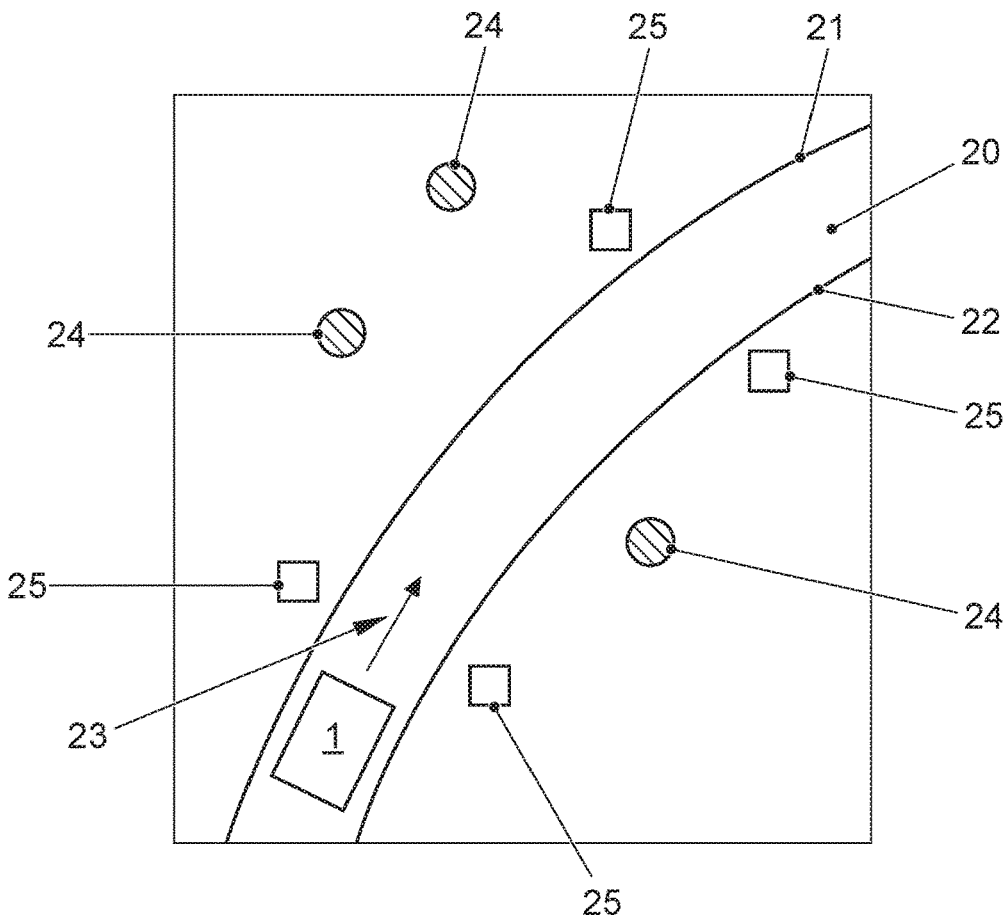
FIG. 2 shows an exemplary embodiment of an environment with different landmarks.
Figure 3:
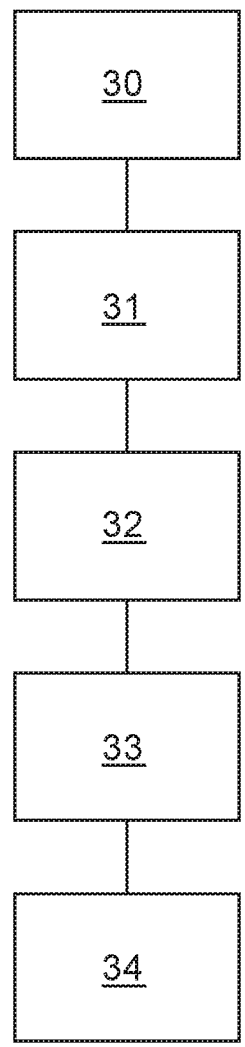
FIG. 3 shows an exemplary embodiment of the disclosed method.

With reference to FIGS. 2 and 3, an exemplary embodiment of the disclosed method will be described. This is based on the exemplary embodiment of the disclosed system described above with reference to FIG. 1, which is explained in more detail by the description of the method.

In the case shown in FIG. 2, the transportation vehicle 1 is positioned on a road 20 with a left-hand carriageway edge 21 and a right-hand carriageway edge 22. The carriageway edges 21, 22 in the example are identified by lane markers. In the area surrounding the road 20, marker posts 25 and hydrants 24 are located. The transportation vehicle 1 in the exemplary embodiment moves along the road 20 in the direction of an arrow 23.

In a first method operation at 30, map data are collected. These include information about the environment around the transportation vehicle 1, in particular, an arrangement of geographically describable features or patterns. The map data in the exemplary embodiment comprise information about the course of the road 20, the arrangement and nature of the markers of the left 21 and right carriageway edge 22 and about positions and features of the marker posts 25. The map data also comprise information about the categories of landmarks to which the landmarks in the area surrounding the transportation vehicle 1 belong. Such categories may be "marker post" for the marker post 25 and "carriageway marking" for the markings at the carriageway edges 21, 22. The map data may also include further landmarks, wherein landmarks can be used in general to describe structures which can be assigned a position and which can be recognized on the basis of certain features, for example, by a pattern recognition process. Semantic landmarks are provided, which can be identified as characteristics belonging to a specific category.

The map data also include information, in particular, position information, about the hydrants 24 as instances of a landmark type "Hydrant". They also comprise additional information about the various types of landmark. In the exemplary embodiment, the additional information specifies a size value, which describes either a bounding box or in a simpler form a circle radius, which allows an area to be defined within which landmarks of a certain type can be represented. The additional information indicates, for example, for the landmark type "marker post", that this is essentially designed to be vertically oriented, narrow and reaching up to a certain height. This information can be used as a basis for generating a virtual frame, which can be used, for example, for rasterizing environment data when detecting landmarks, and in which each of the marker posts 25 can be accommodated.

The additional information relating to the landmark type "Hydrant" in the exemplary embodiment includes the information that it is an elongated object extending upright from the ground, which has a circular cross-section and is red in color. To the extent that this only applies to a subset of the actually existing hydrants 24, the additional information can be structured differently or another landmark type may be provided for different classes of hydrants 24.

The position information contained in the map data for the included landmarks can be specified in different coordinate systems. In the exemplary embodiment a global coordinate system is used, as is common practice, for example, in a position determination procedure using GPS. Alternatively or in addition, the positions can be specified in another coordinate system, in particular, in relation to a particular reference point.

In a second operation at 31, environment data are collected, which takes place in a known manner by the data acquisition unit 3 of the transportation vehicle 1. This involves collecting sensor data in a detection space in the environment of the transportation vehicle 1, wherein the detection space is defined, for example, by a line of sight or a range of the sensors of the data acquisition unit 3. If environment data collected by transportation vehicle-external units are also received, the detection space can be extended accordingly. In the exemplary embodiment it is assumed that the environment data collected by the transportation vehicle 1 comprise information about all the landmarks shown, that is to say, the carriageway edges 21, 22, the marker posts 25 and the hydrants 24.

The environment data are collected such that spatial information relative to the transportation vehicle 1 can be assigned to them. For example, pixels of images captured with the camera 4 correspond to a specific solid angle relative to the transportation vehicle 1. For point clouds collected using the lidar scanner 5, an angle in space relative to the transportation vehicle 1 and a distance from the transportation vehicle 1 can also be determined for each point. In other words, the position of an object that can be detected by the data acquisition unit 3, for example, on the basis of a reflection at its surface, can be determined on the basis of the environment data.

In a further operation at 32, the position of the transportation vehicle 1 is determined. In the exemplary embodiment, the position is determined in the coordinate system of the map data and also comprises an orientation of the transportation vehicle 1, which is to say, the pose of the transportation vehicle 1 in the coordinate system of the map data is determined. This position determination is carried out in a known manner by the localization unit 6. It is based on data from a GPS module and is optimized by a landmark-based localization. To do this, in the exemplary embodiment the marker posts 25 detected by the transportation vehicle 1 and the carriageway edges 21, 22 are used. In the exemplary embodiment it is assumed that in the transportation vehicle 1 the hydrants 24 cannot be detected in the environment data, since an appropriate detector module is not available. Thereafter, such a detector module is generated for the hydrants 24.

To do this, a set of training data is generated in a operation at 33. This involves first performing a transformation of the map data into the coordinate system relative to the transportation vehicle 1. This can also be carried out in the reverse direction. On the basis of the position information for the hydrants 24 included in the environment data, the portions of the collected environment data in which the hydrants 24 are located are then determined. In other words, although the transportation vehicle 1 does not have a detector module for detecting the hydrants 24, it is nevertheless known which subsets of the environment data must include each hydrant 24 of the map data. Portions of the collected environment data are therefore determined and stored, and training data are generated on the basis of the data subsets.

In the exemplary embodiment, a sufficient size and quality of the training data is ensured by using threshold values to examine whether a certain minimum number of portions of the training data are included. The quality of the data portions is also assessed, for example, using quantitative methods to evaluate the image quality. In addition to the number of data portions, it is also taken into account whether these have been collected under a certain minimum number of different environmental conditions. For example, it is ensured that the portions included in the training data were collected at different times of the day and in different light conditions.

If these conditions for the training data are satisfied, in a further operation at 34 a detector module for the landmark type "Hydrant" is generated. In the exemplary embodiment, a machine learning procedure is used for this, in which a pattern recognition is carried out for the portions included in the training data and correlations are determined. Such correlations indicate what kinds of common patterns are detected in different portions of the data, which each comprise different landmarks of the landmark type "Hydrant". By the machine learning procedure a software module is created, which can be used as a detector module for detecting landmarks of the landmark type "Hydrant" on the basis of the collected environment data.

In a further exemplary embodiment, an existing detector module is updated. The training data in this case also comprise the existing detector module, which can subsequently be replaced by an updated detector module.

The newly generated detector module is stored and can be used in a following operation to perform a landmark-based localization. In a further exemplary embodiment the detector module can be transferred to an external unit, which it then allows other units, in particular, other transportation vehicles, to access. In other exemplary embodiments the new detector module can also be generated by the external unit, wherein to do so the training data or the subsets of the collected environment data can be transferred to the external unit to generate training data. This allows computationally intensive machine learning procedures to be relocated outside of the transportation vehicle 1.

In a further exemplary embodiment an output is generated when generating the training data in which the examination of the selected portions of the environment data by a user is requested. For example, the portions are displayed on the touchscreen 9 of the transportation vehicle 1 and the user can decide whether a portion should be used for the training or whether it should be discarded instead, for example, because no landmark of the desired landmark type can be found in the portion or because the quality of the environment data is inadequate.

In a further exemplary embodiment the additional information of the map data relating to the landmark type "Hydrant" comprise an assignment to the generic landmark type "elongated structures". If the transportation vehicle 1 already has a detector module for landmarks of this type, this can be used to determine suitable portions of the environment data in a more targeted way. This information and, where applicable, an already existing detector module, can also be used for generating the new detector module for the hydrants.

LIST OF REFERENCE NUMERALS 1 mobile unit; transportation vehicle
2 memory unit
3 data acquisition unit
4 camera
5 lidar scanner
6 localization unit
7 computing unit
8 learning unit
9 touchscreen
20 road
21 left carriageway edge
22 right carriageway edge
23 arrow
24 first landmarks; hydrant
25 second landmarks; control posts
30 providing map data
31 collecting environment data
32 determining a position
33 generating training data
34 generating a detector module

The invention claimed is:

1. A method for operating a position determination system for a mobile unit that performs computational processing, the method comprising:
    providing map data, which comprise position information for first landmarks of a first landmark class;
    collecting environment data;
    determining a position of the mobile unit;
    generating and storing training data, wherein the training data is generated based on the position of the mobile unit, the collected environmental data and the position information for the first landmarks, wherein the training data is generated by performing a transformation such that the map data is in a coordinate system relative to the mobile unit, wherein portions of the collected environment data in which the first landmarks of the first landmark class are located are determined based on the position information for the first landmarks included in the environment data, whereby subsets of the collected environment data that include the first landmarks are determined and stored as the training data; and
    generating a first detector module for detecting the first landmark class based on the training data,
    wherein the first detector module is implemented in the mobile unit's computational processes,
    wherein the generation of the first detection module is performed via a machine learning procedure that includes determining a correlation for the training data and testing the determined correlation to determine whether the correlation exceeds a threshold value, defined for evaluation of quality of the environment data to exclude environment data with insufficient recording quality and to ensure that the training data is generated based on environment data that is recorded at multiple locations, from multiple perspectives relative to landmarks and under multiple weather conditions,
    wherein the correlation indicates patterns detected in different portions of the environmental data that include the first landmarks of the first landmark class, and
    wherein the machine learning procedure uses pattern recognition to compare portions of the environment data that include the training data with each other and with negative examples without the first landmarks to determine correlations to ensure reliable recognition of the first landmarks as well as reliable recognition of environment data where the first landmark does not exist.

2. The method of claim 1, wherein:
the map data also comprise position information for second landmarks of a second landmark class, wherein the second detector module is implemented in the mobile unit's computational processes; and
the second landmarks are detected by a second detector module for the second landmark class based on the environment data; and
the position of the mobile unit is determined based on the detected second landmarks.

3. The method of claim 1, wherein:
the first landmarks are detected by the first detector module at a later time; and
the position of the mobile unit is determined based on the detected first landmarks.

4. The method of claim 1, wherein:
the training data comprise a subset of the collected environment data;
the subset is generated based on the position information about the first landmarks.

5. The method of claim 1, wherein the map data comprise additional information about landmarks of the first landmark class.

6. The method of claim 5, wherein h additional information comprise a mapping of the first landmark class to a generic landmark class.

7. The method of claim 1, wherein the first detector module is generated in response to the training data satisfying a quality criterion.

8. The method of claim 1, wherein the first detector module is generated by a learning unit integrated in the mobile unit.

9. The method of claim 1, wherein:
the training data are transferred to an external unit;
the first detector module is generated by the external unit; and
the first detector module is transmitted to the mobile unit.

10. The method of claim 1, wherein:
an output is generated based on the training data; and
a user is prompted to confirm the training data.

11. The method of claim 1, wherein the mobile unit is a transportation vehicle.

* * * * *